United States Patent
Shah et al.

(10) Patent No.: US 8,849,989 B2
(45) Date of Patent: Sep. 30, 2014

(54) MECHANISM FOR TRACKING HOST PARTICIPATION IN MULTICAST GROUPS

(75) Inventors: Kunal R. Shah, Mountain View, CA (US); Avoy K. Nanda, Milpitas, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1001 days.

(21) Appl. No.: 12/910,762

(22) Filed: Oct. 22, 2010

(65) Prior Publication Data
US 2012/0102188 A1    Apr. 26, 2012

(51) Int. Cl.
G06F 15/173 (2006.01)
H04L 12/18 (2006.01)

(52) U.S. Cl.
CPC .................................. H04L 12/185 (2013.01)
USPC ............ 709/224; 709/230; 709/231; 709/232

(58) Field of Classification Search
CPC ......... H04L 45/16; H04L 45/04; H04L 45/28; H04L 12/185
USPC .......................................... 709/224, 230–232
See application file for complete search history.

(56) References Cited

U.S. PATENT DOCUMENTS

| | | | |
|---|---|---|---|
| 6,615,039 B1 | 9/2003 | Eldering | |
| 2004/0125803 A1* | 7/2004 | Sangroniz et al. | 370/390 |
| 2005/0091313 A1* | 4/2005 | Zhou et al. | 709/204 |
| 2005/0180448 A1* | 8/2005 | Kobayashi | 370/432 |
| 2007/0047545 A1* | 3/2007 | Bou-Diab et al. | 370/390 |
| 2007/0165634 A1* | 7/2007 | Park | 370/390 |
| 2009/0240804 A1* | 9/2009 | Zhao et al. | 709/224 |
| 2010/0125883 A1 | 5/2010 | Mukherjee et al. | |

FOREIGN PATENT DOCUMENTS

| | | |
|---|---|---|
| TW | 200947971 A | 11/2009 |
| WO | 2007031880 A2 | 3/2007 |

OTHER PUBLICATIONS

Peter Arberg, et al., Network infrastructure for IPTV, Ericsson Review No. 3, 2007, pp. 79-83.
B. Cain, et al., Internet Group Management Protocol, Version 3, Network Working Group, Request for Comments: 3376, Oct. 2002, 53 pages.
Meeyoung Cha, et al., Watching Television Over an IP Network, IMC'08, Oct. 20-22, 2008, Vouliagmeni, Greece, 13 pages.

* cited by examiner

*Primary Examiner* — Phuoc Nguyen
*Assistant Examiner* — Clarence John
(74) *Attorney, Agent, or Firm* — Blakely Sokoloff Taylor & Zafman, LLP

(57) ABSTRACT

A method performed in a network element coupled between a subscriber end station and a multicast source for tracking a history of IGMP report messages. The network element receives and IGMP report message from the subscriber end station and determines a multicast group address and multicast source IP address corresponding to a multicast group to which the network element is a member. The network element builds an IGMP report history record indicating the subscriber end station's identity and comprises the multicast group address, the multicast source IP address, and a time stamp corresponding to the date and time at which the network element received the IGMP report message. This record is then stored in an IGMP report history database along with a plurality of other IGMP report history records so that the network element can maintain a history of IGMP report messages received from the subscriber end station.

18 Claims, 5 Drawing Sheets

Figure 3A  TABLE FOR VIRTUAL ROUTER A 135A

| SUBSCRIBER END STATION IP ADDRESS | SUBSCRIBER END STATION MAC ADDRESS | MULTICAST SOURCE IP ADDRESS | MULTICAST GROUP ADDRESS | TIME STAMP |
|---|---|---|---|---|
| 192.168.1.54 | 01:23:45:67:89:AB | 10.0.0.1 | 224.1.1.1 | 10/1/2010 12:30 |
| 192.168.24.43 | AB:21:45:65:78:FF | 12.0.0.1 | 224.1.1.1 | 10/1/2010 12:31 |
| 192.168.1.54 | 01:23:45:67:89:AB | 11.0.0.1 | 224.1.1.2 | 10/1/2010 13:45 |

[SEPARATE IGMP REPORT HISTORY TABLE PER VIRTUAL ROUTER]

Figure 3B  TABLE FOR SUBSCRIBER END STATION A 110A

| MULTICAST SOURCE IP ADDRESS | MULTICAST GROUP ADDRESS | TIME STAMP |
|---|---|---|
| 10.0.0.1 | 224.1.1.1 | 10/1/2010 12:30 |
| 11.0.0.1 | 224.1.1.2 | 10/1/2010 13:45 |
| 10.0.0.1 | 224.1.1.1 | 10/2/2010 9:25 |

[SEPARATE IGMP REPORT HISTORY TABLE PER SUBSCRIBER END STATION]

Figure 3C  TABLE FOR MULTICAST GROUP ADDRESS 24.1.1.1

| SUBSCRIBER END STATION IP ADDRESS | SUBSCRIBER END STATION MAC ADDRESS | TIME STAMP |
|---|---|---|
| 192.168.1.54 | 01:23:45:67:89:AB | 10/3/2010 11:00 |
| 192.168.24.43 | AB:21:45:65:78:FF | 10/3/2010 11:05 |
| 192.168.1.54 | 01:23:45:67:89:AB | 10/3/2010 16:25 |

[SEPARATE IGMP REPORT HISTORY TABLE PER MULTICAST GROUP]

US 8,849,989 B2

MECHANISM FOR TRACKING HOST PARTICIPATION IN MULTICAST GROUPS

FIELD

Embodiments of the invention relate generally to the field of telecommunications; and more particularly, to the Internet Group Management Protocol (IGMP).

BACKGROUND

In the realm of on demand video, viewers (also referred to as hosts and participants) can subscribe to individual programs on various channels. If the video is being relayed using Internet Protocol Television (IPTV) technology, the set-top boxes (STBS) in the homes need to send subscription messages to a multicast router using IGMP report messages. Upon receiving the subscription messages (known as IGMP report messages), the multicast router will join the participant to an IGMP group of participants for that program and begin streaming the video to the STB. IGMP and IGMP report messages are well known in the art and described more fully in Request for Comments (RFC) 3376, "Internet Group Management Protocol, Version 3," October 2002.

Multicast domains administered independently by separate multicast routers at the same geographical location cater to different sets of participants that may be viewing the same program at the same time provided by a single multicast source (also referred to as a multicast server). In such a situation, it was not previously possible to a get a count of the actual number of participants that are participating in an IGMP group because no single multicast router handled all of the participants for a single group as the participants are in different multicast domains. Further, because of the nature of multicast networks, the multicast server does not know of the participants in the IGMP group but rather knows of the multicast router requesting the video for its participants.

Therefore, it is desirable to provider a mechanism for tracking all participants in an IGMP group without requiring communication between the multicast routers and without modifying existing STBS.

SUMMARY

Embodiments of the invention include a method performed in a network element for tracking a history of IGMP report messages. The network element is coupled between a subscriber end station and a multicast source. The network element receives an IGMP report message from the subscriber end station that indicates that the subscriber end station is a member of a multicast group which is provided by the multicast source. The network element determines a multicast group address and a multicast source internet protocol (IP) address corresponding to the multicast group. The network element builds an IGMP report history record that is separate from any other logging message that is performed as a result of receipt of the IGMP report message. The IGMP report history record indicates the subscriber end station's identity and comprises the multicast group address, the multicast source IP address, and a time stamp indicating the date and time at which the IGMP report message was received by the network element. The network element determines one of a plurality of IGMP report history tables, which corresponds to the subscriber end station's identity, in an IGMP report history database that corresponds to the IGMP report message. The network element stored the IGMP report history record in the determined IGMP report history table. In this way, the network element can maintain a history of IGMP report messages received from the subscriber end station in the IGMP report history table separate from IGMP report message received from other subscriber end stations.

Embodiments of the invention include a method performed in an IGMP report history server for reporting information within an IGMP report history record to an IGMP report history client. The IGMP report history server coupled to the IGMP report history client and coupled to a plurality of network elements that create IGMP report history update messages based on received IGMP report messages. The IGMP report history server receives an IGMP report history update message from one of the plurality of network elements. The IGMP report history update message includes information corresponding to an IGMP report message received by the network element including: a subscriber end station identity, a multicast group address, a multicast source IP address, and a time stamp. The IGMP report history server stores an IGMP report history record, which includes information from the IGMP report history update message, in an IGMP report history database. The IGMP report history server receives a request from the IGMP report history client to transmit information in the IGMP report history record. The IGMP report history server retrieves the IGMP report history record from the IGMP report history database and builds and IGMP report history server response message in response to the request from the IGMP report history client. The IGMP report history server transmits the IGMP report history server response to the IGMP report history client. In this way, a history of IGMP report message from a plurality of network elements can be collected in an IGMP report history server and provided to the IGMP report history client.

Embodiments of the invention include a network element for storing and reporting a history of IGMP report messages. The network element to be coupled between a plurality of subscriber end stations and an IGMP report history client. The network element includes a set of one or more ports to be coupled to the plurality of subscriber end stations. The network element also includes a plurality of virtual routers. Each virtual router includes and IGMP report history module that is configured to detect an IGMP report message transmitted from one of the plurality of subscriber end stations to the virtual router. The virtual routers are further configured to store an IGMP report history record that corresponds to the detected IGMP report message, and the virtual router is configured to transmit information within the IGMP report history record to the IGMP report history client. In this way, automated statistics can be maintained on the number of participants in a multicast group without installing additional hardware at subscriber end stations.

Embodiments of the invention include an IGMP history server for storing and reporting a history of IGMP report messages. The IGMP report history server is to be coupled to an IGMP report history client, for retrieving IGMP report history information from the IGMP report history server, and coupled a network element. The IGMP report history server includes IGMP report history module that is configured to received an IGMP report history update message from the network element that contain information corresponding to an IGMP report message received by the network element. The IGMP report history module further configured to build an IGMP report history record from information within the IGMP report history update message and store the IGMP report history record into a history server IGMP report history database. The IGMP report history module configured to receive a request from the IGMP report history client to transmit information from the IGMP report history record.

The IGMP report history module further configured to, in response to the request, build an IGMP report history server response and transmit the IGMP report history server response to the IGMP report history client. In this way, automated statistics can be maintained on the number of participants in a multicast group without installing additional hardware at subscriber end stations.

BRIEF DESCRIPTION OF THE DRAWINGS

The invention may best be understood by referring to the following description and accompanying drawings that are used to illustrate embodiments of the invention. In the drawings:

FIG. 3A is a table illustrating a plurality of IGMP report history records when an IGMP report history table corresponds to one virtual router.

FIG. 3B is a table illustrating a plurality of IGMP report history records when an IGMP report history table corresponds to one subscriber end station.

FIG. 3C is a table illustrating a plurality of IGMP report history records when an IGMP report history table corresponds to one multicast group.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagrams will be described with reference to the exemplary embodiments of the block diagrams. However, it should be understood that the operations of flow diagrams can be performed by embodiments of the invention other than those discussed with reference to the block diagrams, and the embodiments discussed with reference to the block diagrams can perform operations different than those discussed with reference to the flow diagrams.

To ease understanding, dashed lines have been used in the figures to signify the optional nature of certain items (e.g., features not supported by a given implementation of the invention; features supported by a given implementation, but used in some situations and not in others).

Figure 1:
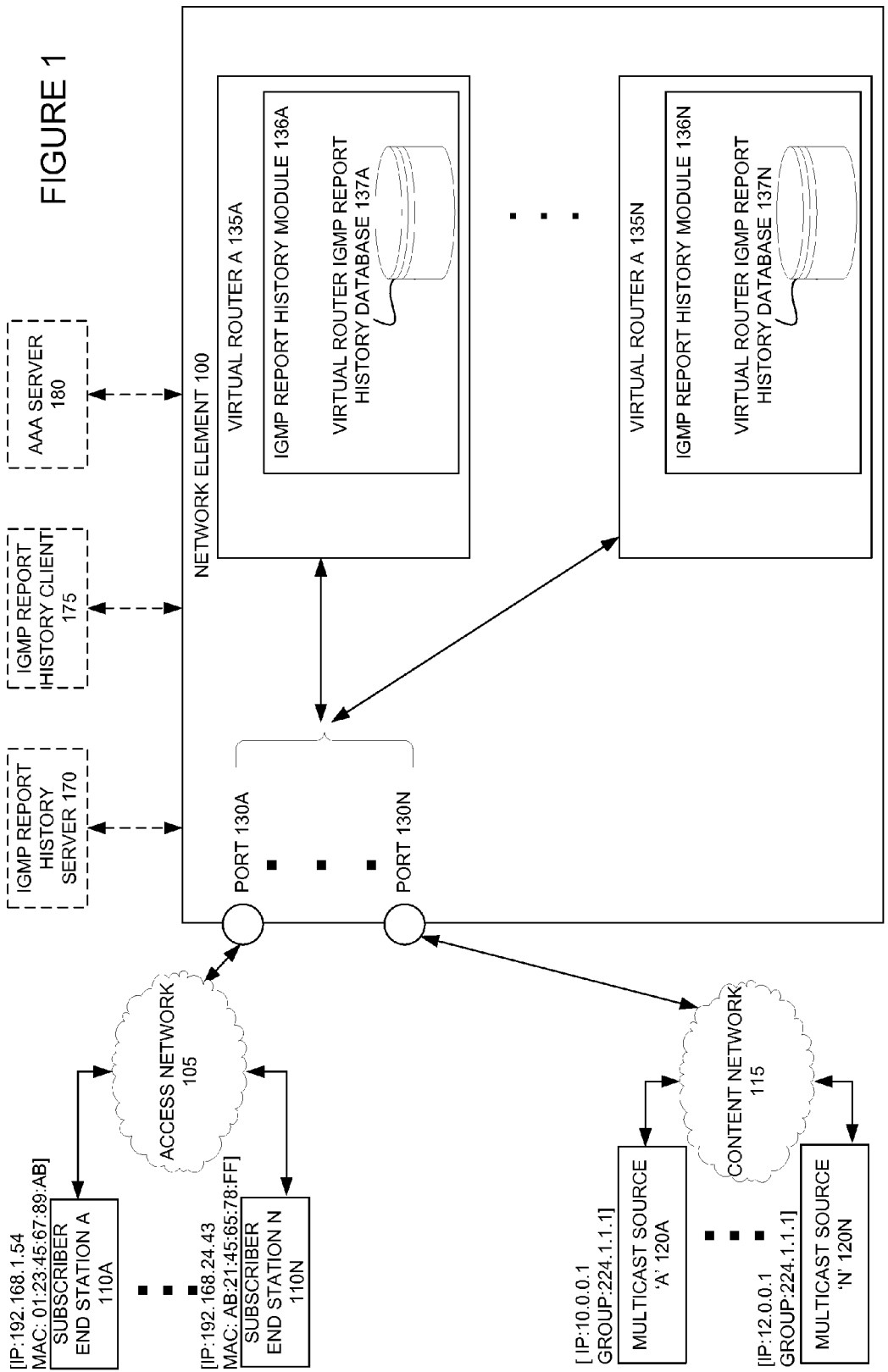
FIG. 1 is a block diagram illustrating an embodiment of a system in which a history of IGMP report messages is maintained, the system including a network element, a plurality of subscriber end stations, and a plurality of multicast sources.

FIG. 1 is a block diagram illustrating an embodiment of a system in which a history of IGMP report messages is maintained, the system including a network element, a plurality of subscriber end stations, and a plurality of multicast sources. In FIG. 1, a network element 100 is comprised of a plurality of ports 130A-130N. The network element 100 further comprises a plurality of virtual routers 135A-135N.

In one embodiment, the virtual routers 135A-135N include an IGMP report history module 136A-136N. Each of the IGMP report history modules 136A-136N is comprises a virtual router IGMP report history database 137A-137N. The network element 100 is coupled through an access network 105 to a plurality of subscriber end stations 110A-110N. Each subscriber end station 110A-110N is assigned an IP address and a MAC address. At least one of the plurality of subscriber end stations 110A-110N is configured to receive multicast network traffic from the network element 100. The network element 100 is further coupled to a plurality of multicast sources 120A-120N through a content network 115. Each multicast source is assigned an IP address and is configured to serve multicast network traffic (e.g. IPTV programming) Each multicast source may serve one or more multicast groups and each multicast group is assigned a multicast address.

The network element 100 further configured to detect multicast report messages received from the plurality of subscriber end stations 110A-110N. IGMP report messages are utilized by the plurality of subscriber end stations 110A-110N to report each subscribe end station's multicast group membership to the network element. The IGMP report messages include information identifying those multicast groups. According to RFC 3376, an IGMP report message may contain a plurality of group records and each group record includes at least a multicast address (referred to herein as multicast group address). In some instances, multiple multicast sources are providing content to the same multicast group. In those cases, the group records contain one or more multicast source IP addresses from which the subscriber end station may receive the content of the multicast group. IGMP report messages are contained within well known IP datagrams at the network layer of the open system interconnection (OSI) model.

In response to receiving the IGMP report messages, the network element 100 creates and stores IGMP report history records that track which multicast groups each subscribed end station 110A-110N reported membership within. In one embodiment, these records are stored in a specialized IGMP report history database 137A-137N and are maintained separately from the generalized log files created in the network element 100. In another embodiment, the IGMP report history records are created and maintained along with the generalized log files but are structured for later retrieval. In one embodiment, the IGMP report history modules 136A-136N are responsible for detecting and maintaining the IGMP report history records for that IGMP report history module's corresponding virtual router 135A-135N. In this way, IGMP report messages that originate from a subscriber end station in communication with virtual router A 135A will be cause IGMP report history records to be stored in virtual router IGMP report history database 137A while IGMP report messages that originate from a subscriber end station in communication with virtual router N 135N will be cause IGMP report history records to be stored in virtual router IGMP report history database 137N. This separation allows for each virtual router to maintain its own policy and security during the collection and maintenance of the IGMP report history records.

In another embodiment, the network element contains a central IGMP report history module responsible for detecting IGMP report messages from the plurality subscriber end station 110A-110N. In this embodiment, each virtual router may comprise an individual IGMP report history database 137A-137N or the network element may contain a centralized IGMP report history database. In either embodiment, the central IGRMP report history module is responsible for transmitting IGMP records to one of the one or more IGMP report history databases for storage.

In one embodiment, the network element 100 further includes functionality for AAA (authentication, authorization, and accounting) protocols (e.g., RADIUS (Remote Authentication Dial-In User Service), Diameter, and/or TACACS+ (Terminal Access Controller Access Control System). AAA can be provided through a client/server model, where the AAA client is implemented on the network element 100 and the AAA server 180 can be implemented either locally on the network element 100 or on a remote end station (e.g., server end station) coupled with the network element 100. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations 110A-110N may be coupled (e.g., through an access network 105) through a network element 100 (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information) used during processing of that subscriber's traffic.

Optionally, the network element 100 is further coupled an IGMP report history server 170 that is configured to collect IGMP report history records from a plurality of sources into a single repository. The IGMP report history server 170 will be described later with reference to FIG. 4. Furthermore, the network element 100 is optionally coupled to an IGMP report history client 175 that is configured to request IGMP report history records.

Figure 2:
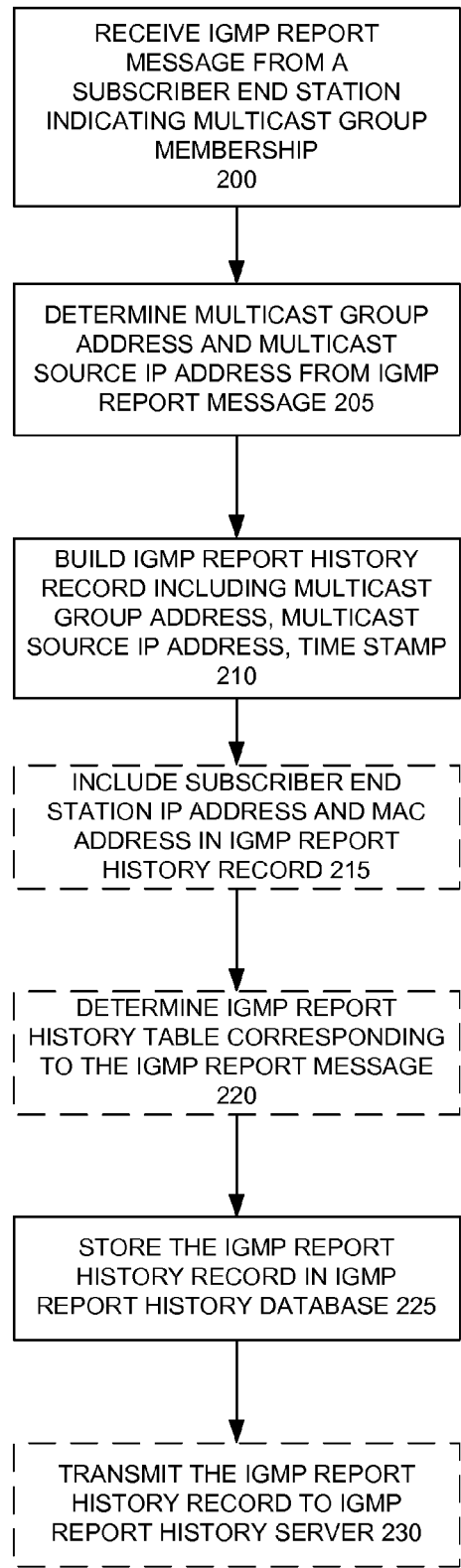
FIG. 2 is a flow chart illustrating a method for maintaining an IGMP report history database.

FIG. 2 is a flow chart illustrating a method for maintaining an IGMP report history database. In one embodiment, instructions to perform the method of FIG. 2 are stored within the network element 100. FIG. 2 begins at the top with a network element receiving an IGMP report message from a subscriber end station, step 200.

FIG. 2 continues with step 205, in which the network element determines a multicast group address from the IGMP report message. The multicast group address being a logical identifier that corresponds to a multicast group to which the subscriber end station is a member. In those instance in which the IGMP report message includes a multicast source IP, the network element further determines a multicast source IP address from the IGMP report message, the multicast source IP address corresponding to a multicast source providing content to that multicast group.

The method continues at step 210 with the network element building an IGMP report history record from information contained within the IGMP report message. The network element includes the determined multicast group address and, optionally, one or more of the determined multicast source IP address in the IGMP report history record it builds. Furthermore the network element includes a time stamp indicating the date and time at which the IGMP report message is received from the subscriber end station.

In some instances, multiple multicast sources are providing content to the same multicast group. In one embodiment, the network element determines all of the multicast source IP addresses associated with that multicast group within the IGMP report message. In another embodiment, the network element determines one of the multicast source IP addresses associated with that multicast group within the IGMP report message. In still other embodiments, a plurality of multicast source IP addresses associated with that multicast group is determined from the IGMP report message. In yet another embodiment, the network element does not determine a multicast source IP address.

Optionally, the network element continues at step 215. In embodiments including step 215, the network element includes information identifying the subscriber end station in the IGMP report history record. In one embodiment, the network element identifies the subscriber end station by the subscriber end station's IP address. In another embodiment, the network element identifies the subscriber end station by the subscriber end station's MAC address, which is available in the data link layer datagram of the IGMP report message. In yet other embodiments, the network element uses more, less, or other information to identify the subscriber end station in the IGMP report history record.

Optionally, the network element continues at step 220. In embodiments including step 20, the network element determines which one of a plurality of IGMP report history tables the IGMP report history record should be stored within. In these embodiments, the network element comprises a plurality of IGMP report history tables separating records into different groups depending on the specific embodiment. Exemplary embodiments of IGRMP report history tables can be understood with reference to FIGS. 3A, 3B, and 3C. In these embodiments, the network element determines the appropriate table depending upon the separation of the tables and the contents of the IGMP report history record.

FIG. 3A is a table illustrating a plurality of IGMP report history records when an IGMP report history table corresponds to one virtual router. This table is shown with exemplary data for virtual router A 135A of network element 100. The table is split into five columns of data: subscriber end station IP address, subscriber end station MAC address, multicast source IP address, multicast group address, and time stamp. Three rows of exemplary data are shown. The first row represents the data of an IGMP report history record that was created by the IGMP report history module 135A after receiving an IGMP report message at 12:30 (entered here in 24-hour notation) on Oct. 1, 2010 from subscriber end station A 110A. That IGMP report message indicating that the subscriber end station 110A reported multicast group membership to the multicast group 224.1.1.1 and was received from multicast source IP address 10.0.0.1. The second row represents the data of an IGMP report history record that was created by the IGMP report history module 135A after receiving an IGMP report message at 12:31 on Oct. 1, 2010 from subscriber end station N 110N. That IGMP report message indicating that the subscriber end station 110N reported multicast group membership to the multicast group 224.1.1.1 and was received from multicast source IP address 12.0.0.1. The third row represents the data of an IGMP report history record that was created by the IGMP report history module 135A after receiving an IGMP report message at 13:45 on Oct. 1, 2010 from subscriber end station A 110A. That IGMP report message indicating that the subscriber end station 110A reported multicast group membership to the multicast group 224.1.1.2 and received from multicast source IP address 11.0.0.1. Other embodiments of the table in 3A track more or less information. For example, one embodiment does not contain a multicast source IP address column.

FIG. 3B is a table illustrating a plurality of IGMP report history records when an IGMP report history table corresponds to one subscriber end station. This table is shown with exemplary data for subscriber end station a 110A of FIG. 1. The table is split into three columns of data: multicast source IP address, multicast group address, and time stamp. The first row represents the data of an IGMP report history record that was created by the network element after receiving an IGMP report message at 12:30 (entered here in 24-hour notation) on Oct. 1, 2010 from subscriber end station A 110A indicating group membership to the multicast group 224.1.1.1 and received from multicast source IP address 10.0.0.1. The second row represents the data of an IGMP report history record that was created by the network element after receiving an IGMP report message at 13:45 on Oct. 1, 2010 from subscriber end station A 110A indicating group membership to the multicast group 224.1.1.2 and received from multicast source IP address 11.0.0.1. The third row represents the data of an IGMP report history record that was created by the network element after receiving an IGMP report message at 9:25 on Oct. 2, 2010 from subscriber end station A 110A indicating group membership to the multicast group 224.1.1.1 and received from multicast source IP address 10.0.0.1. Other embodiments of the table in 3A track more or less information. For example, one embodiment does not contain a multicast source IP address column while another embodiment includes subscriber end station IP address and subscriber end station MAC address.

FIG. 3C is a table illustrating a plurality of IGMP report history records when an IGMP report history table corresponds to one multicast group. This table is shown with exemplary data for multicast group address 24.1.1.1. The table is split into three columns of data: subscriber end station IP address, subscriber end station MAC address, and time stamp. Three rows of exemplary data are shown. The first row represents the data of an IGMP report history record that was created by the network element 100 after receiving an IGMP report message at 11:00 (entered here in 24-hour notation) on Oct. 3, 2010 from subscriber end station A 110A. That IGMP report message indicating that the subscriber end station 110A reported multicast group membership to the multicast group 224.1.1.1. The second row represents the data of an IGMP report history record that was created by network element 100 after receiving an IGMP report message at 11:05 on Oct. 3, 2010 from subscriber end station N 110N. That IGMP report message indicating that the subscriber end station 110N reported multicast group membership to the multicast group 224.1.1.1. The third row represents the data of an IGMP report history record that was created by the network element 135A after receiving an IGMP report message at 16:25 on Oct. 3, 2010 from subscriber end station A 110A. That IGMP report message indicating that the subscriber end station 110A reported multicast group membership to the multicast group 224.1.1.1. Other embodiments of the table in 3A track more or less information. For example, one embodiment does not contain a multicast source IP address column while another embodiment includes multicast source IP address and multicast group address.

Referring back to FIG. 2, the network element then stores the IGMP report history record in an IGMP report history database at step 225. The network element may implement well known database technology. In one embodiment, the network element utilizes a relational database comprised of one or more IGMP report history tables. In another embodiment, the network element utilizes a flat file structured to store a plurality of IGMP report history records.

Optionally, the network element continues at step 230. In step 230, the network element transmits the IGMP report history record to an IGMP report history server. The IGMP report history server is described later with reference to FIG. 4.

Figure 4:
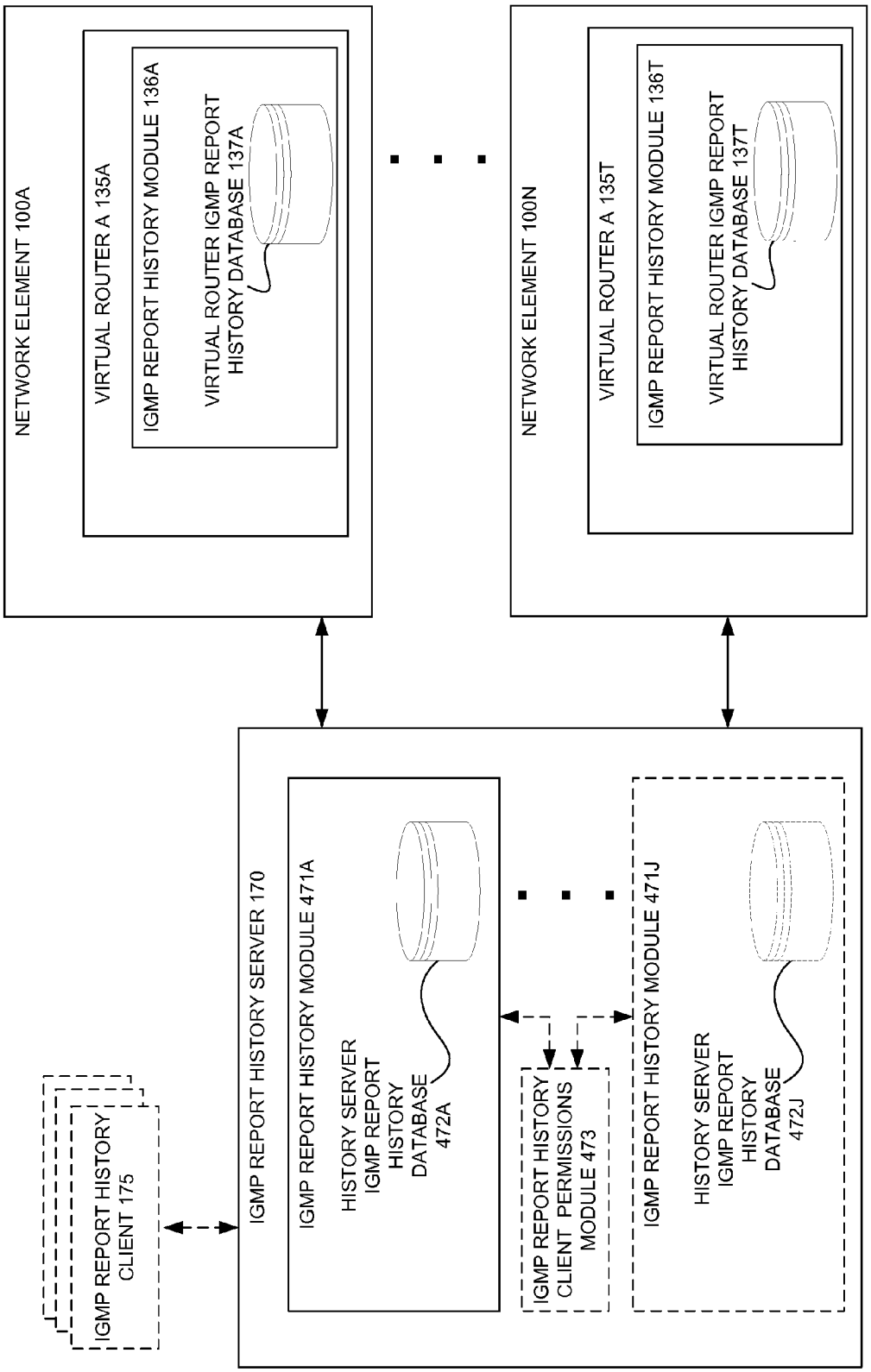
FIG. 4 is a block diagram illustrating an embodiment of a system including a plurality of network elements, an IGMP report history server, and, optionally, a plurality of IGMP report history clients in which a history of IGMP report messages is maintained.

FIG. 4 is a block diagram illustrating an embodiment of a system including a plurality of network elements, an IGMP report history server, and, optionally, one or more IGMP report history clients in which a history of IGMP report messages is maintained. In FIG. 4, a plurality of network elements 100A-100N are coupled to an IGMP report history server 170. The network elements 100A-100N are the same as those described in FIG. 1.

The IGMP report history server 170 comprises one or more IGMP report history modules 471A-471J. Optionally, the IGMP report history server is coupled to one or more IGMP report history clients 175. Each IGMP report history module 471A-471J is configured to receive a plurality of IGMP report history records from the plurality of network elements 100A-100N. In one embodiment, the network elements 100A-100N transmit the required information in IGMP report history update messages that comprise information corresponding to one or more IGMP report history records. Furthermore, the IGMP report history modules 471A-471J are configured to transmit a plurality of IGMP report history records to the one or more IGMP report history clients 175 in response to receiving a request for those IGMP report history records. For example, the IGMP report history server 170 builds an IGMP report history server response that contains the requested information. The IGMP report history server 170 communicates with the plurality of network elements 100A-100N and with the one or more IGMP report history clients 175 through an appropriate data transfer protocol. For example, in one embodiment the plurality of network elements 100A-100N and the IGMP report history server 170 establish Hypertext Transfer Protocol (HTTP) connections. In this embodiment the IGMP report history records can be transmitted through a response to an HTTP GET message or the IGMP report history records can be transmitted as an HTTP POST message that contains the records. In another embodiment, the plurality of network elements 100A-100N establish File Transfer Protocol (FTP) connections in which the IGMP report history records are transmitted. In other embodiments, a combination of these protocols or other network communication protocols may be used, such as a Transmission Control Protocol/Internet Protocol (TCP/IP) connection carrying a database client-server communication.

The IGMP report history server further comprises one or more history server IGMP report history databases. The one or more history server IGMP report history databases are configured to store the IGMP report history records in one or more IGMP report history tables. In one embodiment, each IGMP report history module 471A-471J comprises a separate history server IGMP report history database 472A-472N. In another embodiment, a single history server IGMP report history database services all of the IGMP report history modules in the IGMP report history server 170.

The IGMP report history server 170 is configured to collect a plurality of IGMP report history records from the plurality of network elements 100A-100N. In one embodiment, each of the plurality of network elements 100A-100N are configured to periodically establish a connection with the IGMP report history server 170 and transmit uncollected IGMP report history records. In another embodiment, each of the plurality of network elements 100A-100N are configured to transmit uncollected IGMP report history records upon receiving a command from the IGMP report history server 170. The IGMP report history server 170 stores the plurality of IGMP report history records according the configuration of the IGMP report history server 170. It may be advantageous to have the IGMP report history server 170 store all IGMP report history records together. In this way, the complexity of the design of the IGMP report history server 170 is decreased allowing for easier implementation. In other embodiments, it is desirable to separate IGMP report history records into specific groups based on the inter-relation of those IGMP report history records. For example, in one embodiment it is desirable to separate IGMP report history records based on the virtual router that received the corresponding IGMP report messages such that all IGMP report history records for a given network segment are placed in a central location. In another embodiment, it is desirable to separate IGMP report history records based on the subscriber end station that transmitted the corresponding IGMP report message such that all IGMP report history records for a given subscriber end station are placed in a central location making it easy to construct a history of the multicast group membership for that subscriber end station. In yet another embodiment, it is desirable to separate IGMP report history records based on the multicast groups corresponding to the one or more multicast group records within the corresponding IGMP report messages making it easy to construct a history of the subscriber end station membership to a given multicast group.

Optionally, the IGMP report history server 170 comprises an IGMP report history client permission module 473. In one embodiment, there is a single IGMP report history client permission module 473 that is coupled with the one or more IGMP report history modules 471A-471J. In another embodiment, the IGMP report history server 170 comprises a plurality of IGMP report history client permission modules that are each included within a IGMP report history module. In either embodiment, the IGMP report history client permission module 473 is designed to verify that a given IGMP report history client 175 has permission to access IGMP report history records that IGMP report history client is requesting. In one embodiment, IGMP report history records correspond with a virtual router servicing a particular network segment and the IGMP report history client permissions module 473 verified that the requesting IGMP report history client 175 has been granted permission to access IGMP report history records corresponding with that virtual router. In another embodiment, a first IGMP report history client corresponds with first multicast group and the IGMP report history client permissions module 473 grants access to the first IGMP report history client in response to request for IGMP report history records corresponding with the first multicast group but denies access in response to request for IGMP report history corresponding to a second multicast group. In those instances in which access is granted, the IGMP report history server 170 builds IGMP report history server response containing the requested information and in those instance in which access is denied the IGMP report history server response is build containing an access denied message.

One advantage of the IGMP report history server 170 is given that each of the plurality of network elements 100A-100N may receive IGMP report messages corresponding to a common multicast group, it was not previously possible to construct an accurate history of all subscriber end stations reporting membership in a multicast group from a single data point. By collecting all the IGMP report history records from the plurality of network elements 100A-100N into the IGMP history server 170, it becomes possible to retrieve an accurate history all subscriber end stations coupled to the plurality of network elements 100A-100N reporting membership to the multicast groups.

Figure 5:
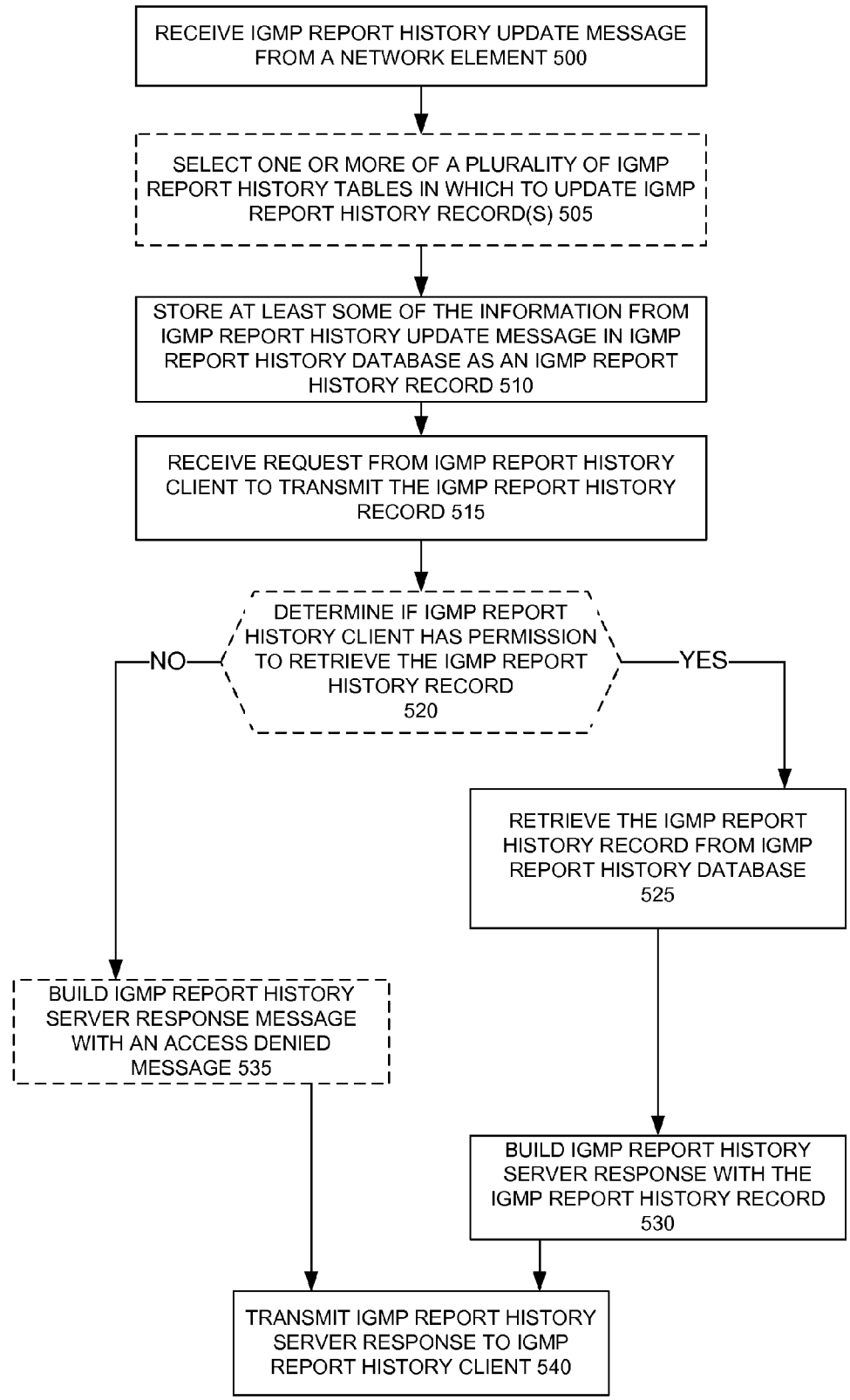
FIG. 5 is a flow chart illustrating a method for maintaining an IGMP report history database and transmitting IGMP report history record information to an IGMP report history client.

FIG. 5 is a flow chart illustrating a method for maintaining an IGMP report history database and transmitting IGMP report history record information to an IGMP report history client. An IGMP report history server starts with receiving an IGMP report history update message from a network element at step 500. In those embodiments with a plurality of IGMP report history tables, the method continues at step 505 by selecting one or more of the plurality of IGMP report history table in which to update one or more IGMP report history records. Next, the IGMP report history server stores at least some of the information from the IGMP report history update message in the IGMP report history database as an IGMP report history record, step 510. In embodiments utilizing a plurality of IGMP report history tables, this information is stored in selected one or more IGMP report history tables. At some point later, the IGMP report history server receives a request from an IGMP history client to transmit the IGMP report history record 515. In embodiment utilizing an IGMP report history client permissions module, the method continues by determining if the IGMP history client has permission to retrieve the IGMP report history record 520. In those embodiments without an IGMP report history client permission module and in those cases where the IGMP report history client is granted access, the method continues at step 525 by retrieving the IGMP report history record from the IGMP report history database and further continues with the IGMP report history server building an IGMP report history server response message that contains the IGMP report history record at step 530. In those cases where the IGMP report history client is denied access, the IGMP report history server builds an IGMP report history server response message that contains an access denied message at step 535. The method concludes with transmitting the IGMP history response message to the IGMP history client at step 540. In one embodiment, instructions to perform this method are stored within the IGMP report history server 170.

The embodiments described herein present a number of advantages. Although not an exhaustive list, and other advantages would be readily apparent to one skilled in the art, the embodiments described allow companies to find out the membership information for multicast groups. In many cases, multicast groups represent an IPTV channel and it is possible to infer from the IGMP report history which channels are being view by subscribers, which subscribers are interest in specific channels, which subscribers do not watch advertisements, which advertisements are favorable to subscribers. All of this information is collected automatically from the network opposed to getting this information from a third-party that collects such information. The data gathered provides information about view patterns at different times rather than just a absolute number of the view. It is further possible to determine the number of viewers of high-definition channels as opposed to standard-definition channels. This information is highly valuable to content providers to focus advertisements and programming to individuals that most desire said content. Further content providers may study viewer habits during pilot programs and use the data collected to provide a more accurate projection of the success of a program. Content provides may use this data to supplement and/or replace Nielsen ratings. For example, the embodiment describer within do not require any additional hardware be installed at a customer's premises and leverages existing signaling protocols to gather information that is currently gathered through specialized cable boxes and viewer diaries. Interest groups can be created automatically and accurately in real-time. The embodiments described can quickly identify changes in viewing patterns since they record each and every IGMP report message and can provider updates at a configured time interval. The embodiments described are configurable and scalable based on the needs of the content provider and number of subscriber end stations.

Furthermore, Content providers may further use this data to develop program packages tailored to their subscribers. In IPTV, advertisements can be targeted to each subscriber based on that subscriber's history rather sending generic advertisement to the subscriber. The content providers may monitor the data to determine indications that subscriber's are misusing the content network, sending falsified content requests, or engaging in denial-of-service attacks.

As used herein, a network element (e.g., a router, multicast router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. For example, the plurality of subscriber end stations in FIG. 1 act as participants (also referred to as hosts in RFC 3376) within multicast groups. The content and/or services are typically provided by one or more end stations (e.g., server end stations, multicast sources) belonging to a service or content provider or end stations participating in a peer to peer service, and may include, for example, public webpages (e.g., free content, store fronts, search services), private webpages (e.g., username/password accessed webpages providing email services), subscription IP television (e.g., video streams provided to consumers subscribed to a service through multicast groups) and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method performed in a network element for tracking a history of Internet Group Management Protocol (IGMP) report messages, wherein the network element is coupled between a subscriber end station and a multicast source, the method comprising the steps of:
   receiving an IGMP report message from the subscriber end station, the IGMP report message indicating that the subscriber end station is a member of a multicast group which is provided by the multicast source;
   determining a multicast group address and a multicast source Internet Protocol (IP) address corresponding to the multicast group;
   building an IGMP report history record separate from any other logging message that is performed as a result of receipt of the IGMP report message, the IGMP report history record indicating the subscriber end station's identity and comprising the multicast group address, the multicast source IP address, and a time stamp indicating the date and time at which the IGMP report message was received; and
   determining one of a plurality of IGMP report history tables in an IGMP report history database that corresponds to the IGMP report message, wherein the determined IGMP report history table corresponds to the subscriber end station's identity;
   storing the IGMP report history record in the determined IGMP report history table;
   whereby network element can maintain a history of IGMP report messages received from the subscriber end station in the IGMP report history table separate from IGMP report messages received from other subscriber end stations.

2. The method of claim 1, wherein the IGMP report history record further comprises the subscriber end station's IP address and Media Access Control (MAC) address.

3. The method of claim 2, wherein the IGMP report history record further comprises a link to account information, the account information corresponding to a subscriber associated with the subscriber end station.

4. The method of claim 1, wherein the network element is further coupled to an IGMP report history server, the IGMP report history server for collating IGMP report history records from a plurality of network elements, and the method further comprising the steps of:
   receiving an IGMP report history server update instruction indicating that the network element should transmit the IGMP report history record to the IGMP report history server; and
   transmitting the IGMP report history record to the IGMP report history server.

5. The method of claim 1, wherein the network element is further coupled to an IGMP report history client, the IGMP report history client for requesting IGMP report history records from one or more of network elements, and the method further comprising the steps of:
   receiving an IGMP report history record request indicating that the IGMP report history client is requesting information corresponding to the IGMP report history record; and
   transmitting information contained within the IGMP report history record to the IGMP report history client.

6. A method performed in an Internet Group Management Protocol (IGMP) report history server for reporting information within an IGMP report history record to an IGMP report history client, the IGMP report history server coupled to the IGMP report history client and coupled to a plurality of network elements that create IGMP report history update messages based on received IGMP report messages, the method comprising the steps of:

receiving an IGMP report history update message from one of the plurality of network elements, the IGMP report history update message including a subscriber end station identity, a multicast group address, a multicast source Internet Protocol (IP) address, and a time stamp corresponding to an IGMP report message received by the network element;

storing an IGMP report history record, which includes information from the IGMP report history update message, in an IGMP report history database;

receiving a request from the IGMP report history client to transmit information in the IGMP report history record;

retrieving the IGMP report history record from the IGMP report history database;

building an IGMP report history server response message in response to the request from the IGMP report history client; and transmitting the IGMP report history server response to the IGMP report history client;

whereby a history of IGMP report messages from a plurality of network elements can be collected in an IGMP report history server and provided to the IGMP report history client.

7. The method of claim 6, wherein the subscriber end station identity comprises a subscriber end station Internet Protocol (IP) address and a subscriber end station media access control (MAC) address.

8. The method of claim 7, wherein the IGMP report history update message further comprises a virtual router identity and the method further comprising the step of selecting one of a plurality of IGMP report history tables in which to store the IGMP report history record, wherein the selection is based on the virtual router identity and the IGMP report history table stores a plurality of IGMP report history records, each IGMP report history record including the subscriber end station IP address, the subscriber end station MAC address, a multicast group address, a multicast source IP address, and a time stamp.

9. The method of claim 7, further comprising the step of selecting one of a plurality of IGMP report history tables in which to store the IGMP report history record, wherein the selection is based on the multicast group address and the IGMP report history table stores a plurality of IGMP report history records, each IGMP report history record including the subscriber end station IP address, the subscriber end station MAC address, and a time stamp.

10. The method of claim 6, further comprising the step of selecting one of a plurality of IGMP report history tables in which to store the IGMP report history record, wherein the selection is based on the subscriber end station identity and the IGMP report history table stores a plurality of IGMP report history records, each IGMP report history record including a multicast group address, a multicast source IP address, and a time stamp.

11. The method of claim 6, further comprising the steps of:

determining whether the IGMP report history client has permission to retrieve the IGMP report history record;

in response to determining that the IGMP report history client does not have permission to retrieve the requested IGMP report history record, building the IGMP report history response with an access denied message; and in response to determining that the IGMP report history client has permission to retrieve the requested IGMP report history record, building the IGMP report history response with information contained within the IGMP report history record.

12. A network element for storing and reporting a history of Internet Group Management Protocol (IGMP) report messages, to be coupled between a plurality of subscriber end stations and a IGMP report history client, the network element comprising:

a set of one or more ports to be coupled to the plurality of subscriber end stations; and a plurality of virtual routers, each virtual router including an IGMP report history module configured to:

detect an IGMP report message transmitted from one of the plurality of subscriber end stations to the virtual router, store an IGMP report history record, the IGMP report history record to correspond to the detected IGMP report message, and transmit information within the IGMP report history record to the IGMP report history client;

whereby automated statistics can be maintained on the number of participants in a multicast group without installing additional hardware at subscriber end stations.

13. The network element of claim 12, wherein the IGMP report history module further comprises a virtual router IGMP report history database configured to store a plurality of IGMP report history records.

14. An Internet Group Management Protocol (IGMP) history server for storing and reporting a history of IGMP report messages, the IGMP report history server to be coupled to an IGMP report history client and a network element, the IGMP report history client for retrieving IGMP report history information from the IGMP report history server, the IGMP report history server comprising:

an IGMP report history module configured to:

receive an IGMP report history update message from the network element, wherein the IGMP report history update message is to contain information corresponding to an IGMP report message received by the network element, build an IGMP report history record from information within the IGMP report history update message, store the IGMP report history record into a history server IGMP report history database, receive a request from the IGMP report history client to transmit information from the IGMP report history record, build an IGMP report history server response, and transmit the IGMP report history server response to the IGMP report history client;

whereby automated statistics can be maintained on the number of participants in a multicast group without installing additional hardware at subscriber end stations.

15. The IGMP report history server of claim 14, further comprising an IGMP report history client permissions module configured to verify whether the IGMP report history client has permission to receive information in the IGMP report history record, the IGMP report history module further configured to:

receive notification from the IGMP report history client permissions module on whether the IGMP report history client has permission to receive information in the IGMP report history record;

in response to being notified the IGMP report history client has permission, the IGMP server response is to comprise information from the IGMP report history record; and in response to being notified the IGMP report history client does not have permission, the IGMP server response is to comprise information that access is denied.

16. The IGMP report history server of claim 15, wherein the IGMP report history record is to be stored in an IGMP report history table to correspond to a virtual router in the network element and the IGMP client permissions module is to verify permission by checking if the IGMP report history client is to have access to records corresponding to the virtual router.

17. The IGMP report history server of claim 15, wherein the IGMP report history record is to be stored in an IGMP report history table to correspond to a subscriber end station coupled to the network element and the IGMP client permissions module is to verify permission by checking if the IGMP report history client is to have access to records corresponding to the subscriber end station.

18. The IGMP report history server of claim 15, wherein the IGMP report history record is to be stored in an IGMP report history table to correspond to a multicast group coupled to the network element and the IGMP client permissions module is to verify permission by checking if the IGMP report history client is to have access to records corresponding to the multicast group.

* * * * *

UNITED STATES PATENT AND TRADEMARK OFFICE
CERTIFICATE OF CORRECTION

PATENT NO. : 8,849,989 B2  
APPLICATION NO. : 12/910762  
DATED : September 30, 2014  
INVENTOR(S) : Shah et al.

Page 1 of 1

It is certified that error appears in the above-identified patent and that said Letters Patent is hereby corrected as shown below:

In the Specification

In Column 4, Line 43, delete "programming)" and insert -- programming). --, therefor.

In Column 5, Line 30, delete "IGRMP" and insert -- IGMP --, therefor.

In Column 6, Line 57, delete "IGRMP" and insert -- IGMP --, therefor.

In Column 7, Line 4, delete "module 135A" and insert -- module 136A --, therefor.

In Column 7, Line 12, delete "module 135A" and insert -- module 136A --, therefor.

In Column 7, Line 19, delete "module 135A" and insert -- module 136A --, therefor.

In Column 7, Line 31, delete "station a" and insert -- station A --, therefor.

Signed and Sealed this  
Twelfth Day of May, 2015

Michelle K. Lee  
*Director of the United States Patent and Trademark Office*